US011966254B2

(12) United States Patent
Hetrich et al.

(10) Patent No.: US 11,966,254 B2
(45) Date of Patent: Apr. 23, 2024

(54) PERIPHERAL SYSTEM FOR AUTOMATED CABLE BUNDLING SOLUTIONS

(71) Applicant: ABB Schweiz AG, Baden (CH)

(72) Inventors: Matthew Hetrich, Raleigh, NC (US);
Jonah Kadoko, Raleigh, NC (US);
Sheng Zhong, Raleigh, NC (US);
Daniel Pierce Armstrong, Raleigh, NC (US)

(73) Assignee: ABB SCHWEIZ AG, Baden (CH)

( * ) Notice: Subject to any disclaimer, the term of this patent is extended or adjusted under 35 U.S.C. 154(b) by 54 days.

(21) Appl. No.: 17/508,929

(22) Filed: Oct. 22, 2021

(65) Prior Publication Data

US 2023/0128971 A1    Apr. 27, 2023

(51) Int. Cl.
     *G06F 1/16*      (2006.01)
     *B65B 13/02*      (2006.01)
     *B65B 13/04*      (2006.01)
     *B65B 13/18*      (2006.01)
     *B65B 13/32*      (2006.01)
     *B65B 27/06*      (2006.01)
     *B65B 57/02*      (2006.01)
     *B65B 57/18*      (2006.01)
     *G05B 15/02*      (2006.01)
     *G06F 3/0482*    (2013.01)
     *G06F 15/02*     (2006.01)

(52) U.S. Cl.
CPC .......... *G06F 1/1607* (2013.01); *B65B 13/025* (2013.01); *B65B 13/18* (2013.01); *B65B 13/327* (2013.01); *B65B 27/06* (2013.01); *B65B 57/02* (2013.01); *B65B 57/18* (2013.01); *G05B 15/02* (2013.01)

(58) Field of Classification Search
CPC ..... B65B 13/025; B65B 13/18; B65B 13/325; B65B 13/327; B65B 27/06; B65B 57/02; B65B 57/18; B29C 66/90; G06F 1/1607; G05B 15/02
USPC .................................. 156/73.1, 580.1, 582.2
See application file for complete search history.

(56) References Cited

U.S. PATENT DOCUMENTS

| | | | |
|---|---|---|---|
| 4,265,687 A | 5/1981 | Mercer et al. | |
| 4,534,817 A | 8/1985 | O'Sullivan | |
| 5,509,994 A | 4/1996 | Recchia et al. | |
| 6,136,118 A * | 10/2000 | Bartholomew | B65B 13/327 156/580.2 |
| 6,533,013 B1 * | 3/2003 | Nix | B65B 13/187 156/367 |
| 2014/0336810 A1 * | 11/2014 | Li | G05B 15/02 700/103 |

(Continued)

*Primary Examiner* — Matthew Katcoff
*Assistant Examiner* — Mohammed S. Alawadi
(74) *Attorney, Agent, or Firm* — Greenberg Traurig, LLP

(57) ABSTRACT

A system includes a tool for installing a cable material around a set of elongate members. The tool includes a housing; a cartridge detachably connected to the housing; and a jaw detachably connected to the housing. The cartridge has a length of cable material. The jaw is configured to extend around the set of elongate members to install the length of cable around the set of elongate members. A welding horn is detachably connected to the housing. At least one processor is configured to read a programmable chip. The programmable chip stores a set of parameters for at least one of the cartridge, the jaw, or the welding horn.

19 Claims, 5 Drawing Sheets

(56) References Cited

U.S. PATENT DOCUMENTS

| | | | |
|---|---|---|---|
| 2015/0068660 A1* | 3/2015 | Wang | B29C 66/92443 156/64 |
| 2017/0174374 A1* | 6/2017 | Figiel | B65B 57/00 |
| 2022/0143932 A1 | 5/2022 | Kadoko et al. | |

* cited by examiner

PERIPHERAL SYSTEM FOR AUTOMATED CABLE BUNDLING SOLUTIONS

FIELD

This disclosure relates generally to cables. More particularly, this disclosure relates to automated cable bundling and automated adjustment of cable welding parameters.

BACKGROUND

An automated cable bundling tool is generally configured with set operating parameters based on material characteristics. However, when these conditions change, due to a change in materials, cable geometry, and bundle size, the welding parameters have to change accordingly to protect the cable being used.

SUMMARY

In some embodiments, a system includes a tool for installing a cable material around a set of elongate members. In some embodiments, the tool includes a housing; a cartridge detachably connected to the housing, the cartridge having a length of cable material; and a jaw detachably connected to the housing. In some embodiments, the jaw is configured to extend around the set of elongate members to install the length of cable around the set of elongate members. In some embodiments, a welding horn is detachably connected to the housing. In some embodiments, at least one processor is configured to read a programmable chip. In some embodiments, the programmable chip stores a set of parameters for at least one of the cartridge, the jaw, or the welding horn.

In some embodiments, the programmable chip includes a first programmable chip secured to the cartridge; a second programmable chip secured to the jaw; and a third programmable chip secured to the welding horn.

In some embodiments, the programmable chip includes a first programmable chip embedded in the cartridge; a second programmable chip embedded in the jaw; and a third programmable chip embedded in the welding horn.

In some embodiments, the at least one processor is further configured to program the programmable chip with updated parameters.

In some embodiments, the set of parameters includes at least one of jaw size, safety code, cartridge manufacturer, cable material, cable geometry, bundle size, cable cartridge feeding length, tension force, welding power, welding time, or any combination thereof.

In some embodiments, the tool automatically adjusts one or more settings according to the set of parameters read by the at least one processor from the programmable chip.

In some embodiments, the programmable chip is encrypted, and the at least one processor is further configured to decrypt the programmable chip.

In some embodiments, by being encrypted, the programmable chip prevents a user from installing an incompatible component with the tool.

In some embodiments, the programmable chip is an EEPROM or RFID.

In some embodiments, a method includes receiving a first set of parameters from a component of a cable bundling tool by a processor of the cable bundling tool. In some embodiments, the method includes modifying one or more settings of the cable bundling tool based on the first set of parameters.

In some embodiments, the first set of parameters are received in response to at least one of a cartridge, a jaw, and a welding horn being connected to a housing of the cable bundling tool.

In some embodiments, the first set of parameters are received from a programmable chip secured to at least one of the cartridge, the jaw, or the welding horn.

In some embodiments, the method includes storing, in a memory of the cable bundling tool, the one or more settings of the cable bundling tool as modified.

In some embodiments, the first set of parameters are received from a programmable chip secured to at least one of a cartridge, a jaw, or a welding horn; and further comprising decrypting a security key on the programmable chip with the processor through a decryption key stored in a memory of the cable bundling tool.

In some embodiments, a cable bundling tool includes a housing. In some embodiments, the cable bundling tool includes at least one receptacle for interchangeably attaching a component. In some embodiments, the cable bundling tool includes at least one processor for reading at least one programmable chip on the component.

In some embodiments, the at least one receptacle further includes a first receptacle configured to receive a cartridge, the cartridge having a first programmable chip secured to the cartridge; a second receptacle configured to receive a jaw, the jaw having a second programmable chip secured to the jaw; and a third receptacle configured to receive a welding horn, the welding horn having a third programmable chip secured to the welding horn.

In some embodiments, the at least one processor further includes a first processor disposed at the first receptacle; a second processor disposed at the second receptacle; and a third processor disposed at the third receptacle.

In some embodiments, the at least one programmable chip is encrypted, and the at least one processor is configured to decrypt the at least one programmable chip to access information stored on the at least one programmable chip.

In some embodiments, the at least one processor is configured to update information stored on the at least one programmable chip depending on usage of a component while attached to the cable bundling tool.

In some embodiments, the cable bundling tool includes an indicator light, the indicator light configured to at least one of alarm a user that the cable bundling tool requires preventative maintenance, an error with a connection to the component, or when a consumable is depleted.

BRIEF DESCRIPTION OF THE DRAWINGS

References are made to the accompanying drawings that form a part of this disclosure and that illustrate embodiments in which the systems and methods described in this Specification can be practiced.

Like reference numbers represent the same or similar parts throughout.

DETAILED DESCRIPTION

Embodiments of this disclosure are directed to a cable bundling system including a cable bundling tool and its components. More specifically, the cable bundling system described in this disclosure includes a hand-held tool that distributes a continuously extruded cable that is tensioned and bonded around a cable bundle.

In some embodiments, various components may be attached to the tool. In some embodiments, each component can include a programmable chip embedded therein that stores information about the particular component. In some embodiments, the tool is equipped with a processor configured to read the information on the programmable chip from the various components and to automatically calibrate one or more operating parameters of the tool based on the information as read from the components. In some embodiments, the functionality of automatically obtaining these values and automatically adjusting the operating characteristics of the tool can, for example, protect the strap being used, protect the wires being bundled, and prevent incompatible components from being introduced to the tool, thereby achieving consistent welding quality, and improving operator experience.

Figure 1:
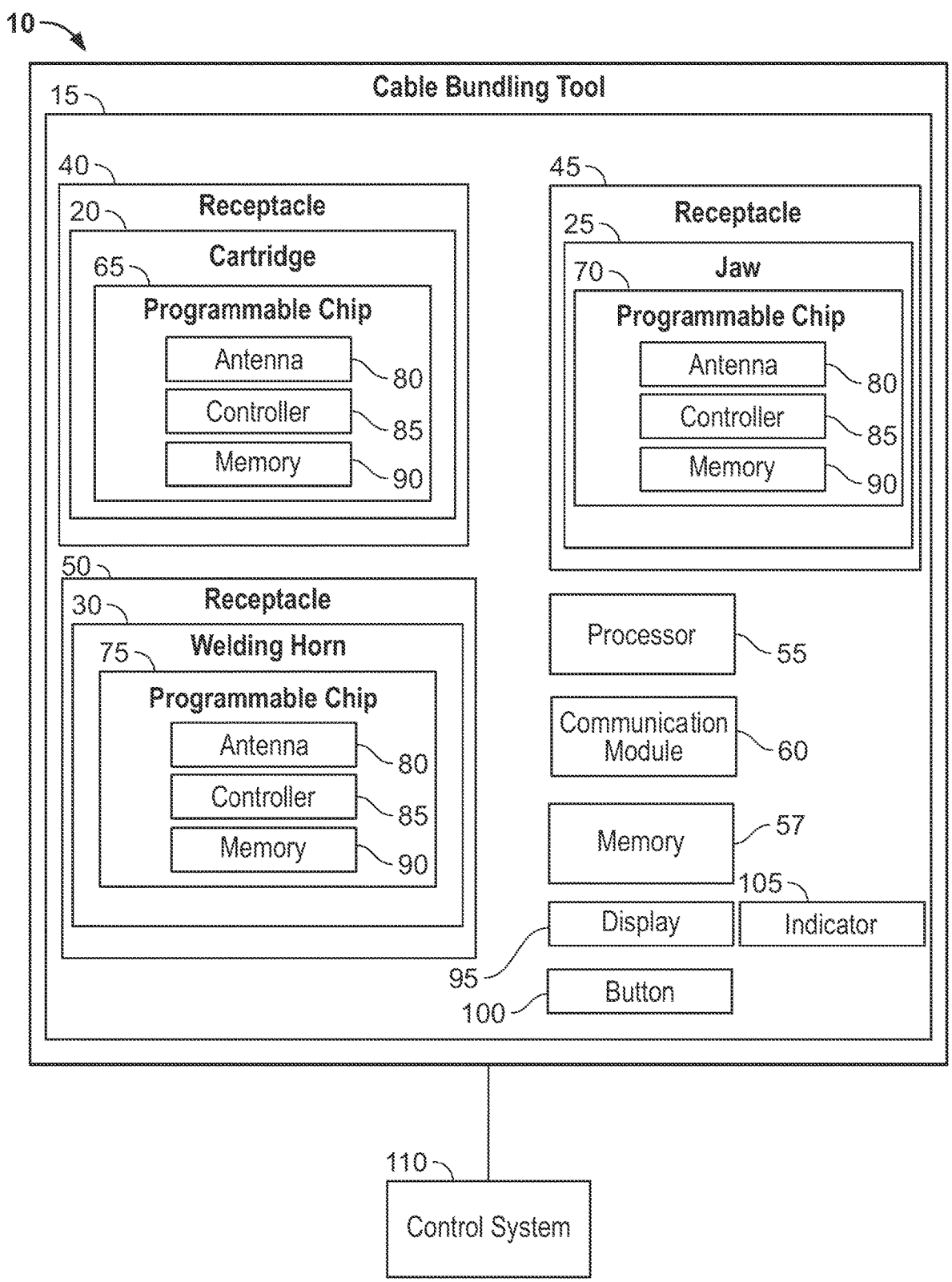
FIG. 1 is a schematic view of a tool bundling system, according to some embodiments.

FIG. 1 is a schematic view of a cable bundling system 10, according to some embodiments. In some embodiments, the cable bundling system 10 can be used to secure a cable around a bundle of elongated members such as, but not limited to, a bundle of wires, cables, or the like.

In some embodiments, the cable bundling system 10 includes a cable bundling tool 15. In some embodiments, the cable bundling tool 15 can include a cartridge 20 including a spool of material, a jaw 25 for dispensing the material around a bundle, and a welding horn 30 for welding the material together around the bundle. In some embodiments, the cartridge 20 is configured to include a length of cable material for securing around the bundle of elongated members. In some embodiments, the jaw 25 includes an arc-shaped pair of jaws that are configured to extend around the set of elongate members being joined together. The jaws 25 are configured to provide the cable material so that it surrounds the elongate members being joined. The welding horn 30 is configured to weld a portion of the cable material together to secure the cable material around the elongate members being joined together.

The cable bundling tool 15 includes a housing 35 having a plurality of receptacles including at least a first receptacle 40 (e.g., for detachably receiving the cartridge 20), a second receptacle 45 (e.g., for detachably receiving the jaw 25), and a third receptacle 50 (e.g., for detachably receiving the welding horn 30). It is to be appreciated that a number of receptacles can be greater than three. The number of receptacles is dependent upon a number of detachable components of the cable bundling tool 15.

In some embodiments, the housing 35 includes a processor 55, a memory 57, and a communication module 60. In some embodiments, the communication module 60 includes a transmit-receive circuit and an antenna. The communication module 60 is configured to communicate with and interpret a signal from a programmable chip 65, a programmable chip 70, and a programmable chip 75. The programmable chip 65 can be installed on the cartridge 20. The programmable chip 70 can be installed on the jaw 25. The programmable chip 75 can be installed on the welding horn 30. In some embodiments, one or more of the cartridge 20, the jaw 25, or the welding horn 30 may not include a programmable chip.

In some embodiments, the programmable chip 65, the programmable chip 70, and the programmable chip 75 can each include an antenna 80, a controller 85, and a memory 90.

In some embodiments, the antenna 80 of the respective one of the programmable chip 65, the programmable chip 70, or the programmable chip 75 can communicate with the communication module 60 of the cable bundling tool 15. In such embodiments, the communication can include providing a set of parameters stored in the memory 90 to the cable bundling tool 15. In some embodiments, the programmable chip 65, the programmable chip 70, the programmable chip 75, or any combination thereof, can be encrypted. In such embodiments, the processor 55 may utilize a decryption key to decrypt the information included on the programmable chip 65, the programmable chip 70, the programmable chip 75, or any combination thereof.

In some embodiments, the memory 90 can store one or more parameters relevant to the usage of the cable bundling tool 15. In some embodiments, the set of parameters can include, but is not limited to, a jaw size, a safety code, a cable material, a cartridge manufacturer, a cable cross-section, a cable geometry, a cable force rating, a bundle size, an optimal jaw size, a welding parameter including feeding length, tension force, welding power, and welding time, similar characteristics, or any combination thereof.

In some embodiments, the programmable chip 65, the programmable chip 70, or the programmable chip 75 is an electrically erasable programmable read-only memory (EEPROM), radio frequency identification (RFID), or other suitable chip that stores parameters related to the material and strap geometry or the parameters of the joining method (e.g., welding parameters) so that when cartridge 20, jaw 25, or welding horn 30 is connected to the cable bundling tool 15, it is automatically recognized without user input. In some embodiments, the programmable chip 65, the programmable chip 70, and the programmable chip 75 may communicate with the processor 55 via, for example, a near field communication (NFC) protocol.

In some embodiments, the memory 90 of one or more of the programmable chip 65, the programmable chip 70, or the programmable chip 75 may be capable of being written to as well. For example, the cable bundling tool 15 may be able to provide feedback on the usage of the tool to the memory 90 that can be stored. In some embodiments, this can include tracking consumption of the material in the cartridge 20. For example, for the cartridge 20, the memory 90 can be updated with information on how much material is remaining. When the material is almost consumed, a signal may alert the user to replace the cartridge 20. In some embodiments, preventative maintenance of the cable bundling tool 15 may be recommended based off of consumable usage and lifetime.

In some embodiments, the cable bundling tool 15 is configured to automatically adjust the operating parameters of the cable bundling tool 15 based on the component that is attached to the cable bundling tool 15. For example, when the jaw 25 is replaced (or installed in the first place), the cable bundling tool 15 can authenticate the jaw 25 if a security code is present. In some embodiments, if the security code is not authenticated, the cable bundling tool 15 may disable the cable bundling tool 15. In some embodiments, if the security code is authenticated, the processor 55 can read the memory 90 of the associated component and determine, for example, a jaw size, and automatically adjust, for example, a feed length of the material for welding based on the determined parameters. In some embodiments, if the cable bundling tool 15 is unable to communicate with the component, the cable bundling tool 15 may interpret this as a faulty or otherwise incompatible component, and may disable the cable bundling tool 15 until a proper communicating component is connected.

In some embodiments, the welding horn 30 may be used to identify a given cable material installed on the cable bundling tool 15 and the ultrasonic welding parameters of the given cable material. Consequently, the cable bundling tool 15 may tune welding parameters of the cable bundling tool 15 based on the ultrasonic welding parameters of the given cable material. For example, the ultrasonic welding parameters of a given cable material can be unique and inherent to that material (e.g., an energy consumption of HDPE cables, 5 Joules (J), is lower than for POM or PA66, which is approximately 15 J). Thus, the ultrasonic welding parameters of the welding horn, and/or any components of the welding stack, can have unique electrical properties such as the resonant frequency, impedance, and amplitude.

In some embodiments, the cable bundling tool 15 includes a display 95, at least one button 100, and at least one indicator 105. In some embodiments, the display 95 can include a touchscreen display, in which case the least one button 100 may be integral with the display 95, not separate from the display 95. In some embodiments, the at least one indicator 105 can include a visual indicator (e.g., an indicator light such as a light-emitting diode (LED) or the like), an audible indicator (e.g., a speaker or the like), or a haptic indicator (e.g., a vibration device or the like). In some embodiments, the processor 55 executes a program stored in the memory to operate the cable bundling tool 15 to bundle cables.

In some embodiments, the display 95 can show various features of the cable bundling tool 15 including, but not limited to, the type and features of the component attached to the cable bundling tool 15, the cycle count of a particular attached component, the circumference of, for example, the jaw 25, the length of material remaining on the cartridge 20, an impedance of the welding horn 30 while bonding the material around a set of cables, and when the welding horn 30 detects the material, and other features. It is to be appreciated that the types of data displayed by the display 95 are not intended to be limiting. Additionally, in some embodiments, the display 95 is not present.

In some embodiments, the at least one indicator 105 can provide an indication to a user that a component is attached to the tool. In some embodiments, the at least one indicator 105 can indicate to a user an alarm condition. For example, the at least one indicator 105 can indicate to the user a condition of the cable bundling tool 15 including, but not limited to, being due for preventative maintenance, material being exhausted, an error with connecting to an attached component or reading the programmable chip of the component by the processor 55, or the like.

Examples of computer-readable storage media include, but are not limited to, any tangible medium capable of storing a computer program for use by a programmable processing device to perform functions described herein by operating on input data and generating an output. A computer program is a set of instructions that can be used, directly or indirectly, in a computer system to perform a certain function or determine a certain result. Examples of computer-readable storage media include, but are not limited to, a floppy disk; a hard disk; a random access memory (RAM); a read-only memory (ROM); a semiconductor memory device such as, but not limited to, an erasable programmable read-only memory (EPROM), an electrically erasable programmable read-only memory (EEPROM), Flash memory, or the like; a portable compact disk read-only memory (CD-ROM); an optical storage device; a magnetic storage device; other similar device; or suitable combinations of the foregoing.

In some embodiments, the processor 55 and the memory 57 can be in electronic communication with the cable bundling tool 15, but physically separate from the cable bundling tool 15. For example, the cable bundling tool 15 can be connected to a control system 110 and the processor 55 and the memory 57 can be part of the control system 110. In some embodiments, the control system 110 can be wired to the cable bundling tool 15 and can provide power to the cable bundling tool 15.

Figure 2:
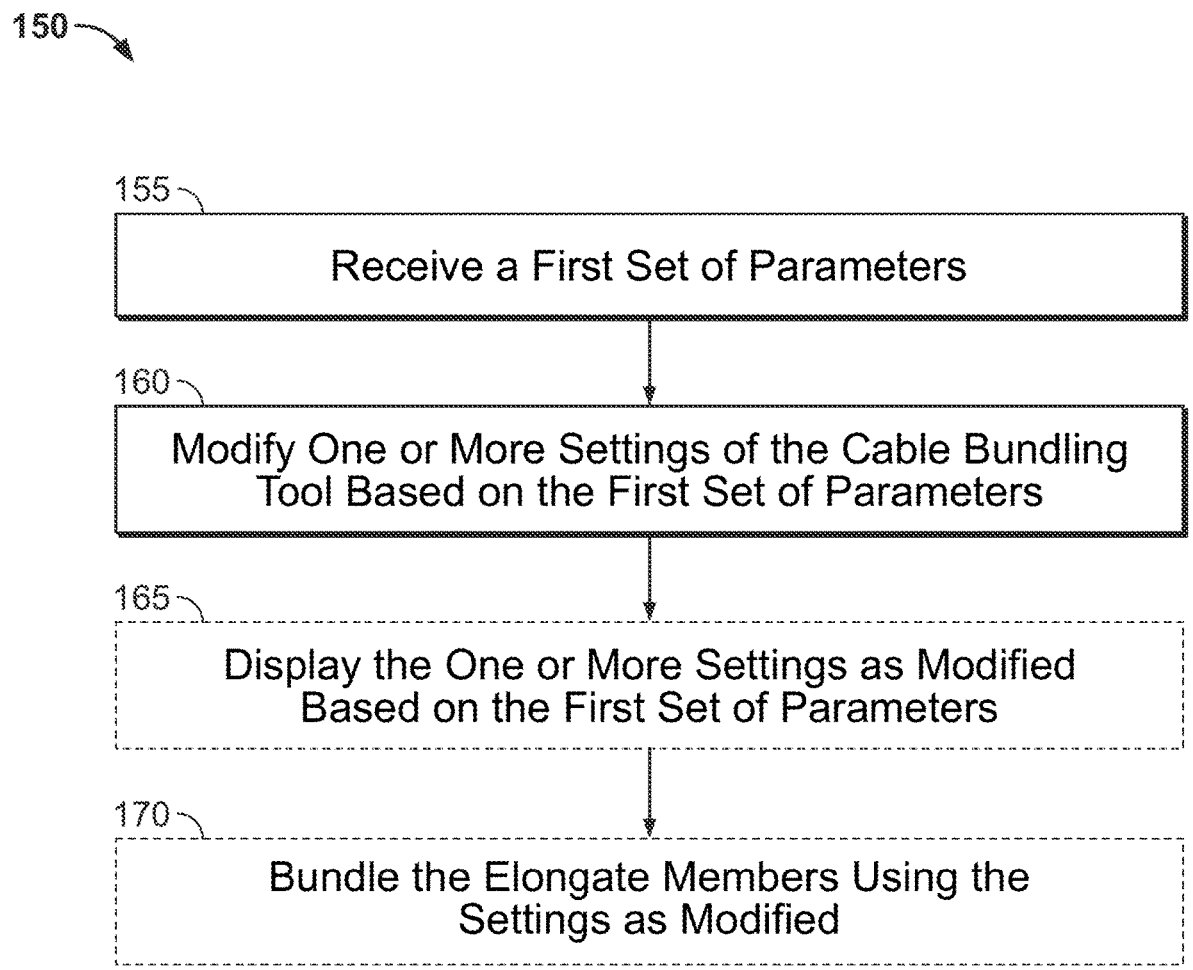
FIG. 2 is a flowchart of a method, according to some embodiments.

FIG. 2 is a flowchart of a method 150, according to some embodiments. The method 150 can generally be used to control one or more parameters in a cable bundling tool (e.g., the cable bundling tool 15 of FIG. 1).

At block 155, the method 150 includes receiving, by a processor (e.g., the processor 55 of FIG. 1) on the cable bundling tool 15, a first set of parameters. In some embodiments, the first set of parameters can be received from the processor 55 through communication with at least one of the programmable chip 65, the programmable chip 70, or the programmable chip 75. In some embodiments, the processor 55 can be onboard the cable bundling tool 15 or part of a control system connected in communication with the cable bundling tool 15. In some embodiments, at block 155 the processor 55 can receive a plurality of sets of parameters. In some embodiments, a number of sets of parameters is dependent upon a number of components connected to the cable bundling tool 15. For example, in some embodiments, a first set of parameters can be received from the programmable chip 65, a second set of parameters can be received from the programmable chip 70, and a third set of parameters can be received from the programmable chip 70. It is to be appreciated that in some embodiments, a number of sets of parameters received can be less than the number of installed components.

At block 160, the method 150 includes modifying one or more settings of the cable bundling tool 15 based on the first set of parameters.

Optionally, at block 165, the method 150 includes displaying the one more settings of the cable bundling tool 15 as modified based on the first set of parameters. In such embodiments, the display can be on the cable bundling tool 15 itself (when a display is present on the cable bundling tool 15) or can be on a peripheral display that is connected to the control system.

Optionally, at block 170, the method 150 includes bundling a set of elongate members (e.g., wires or the like) with a cable material from the cartridge and using the one or more settings of the cable bundling tool 15 as modified based on the first set of parameters.

Figure 3:
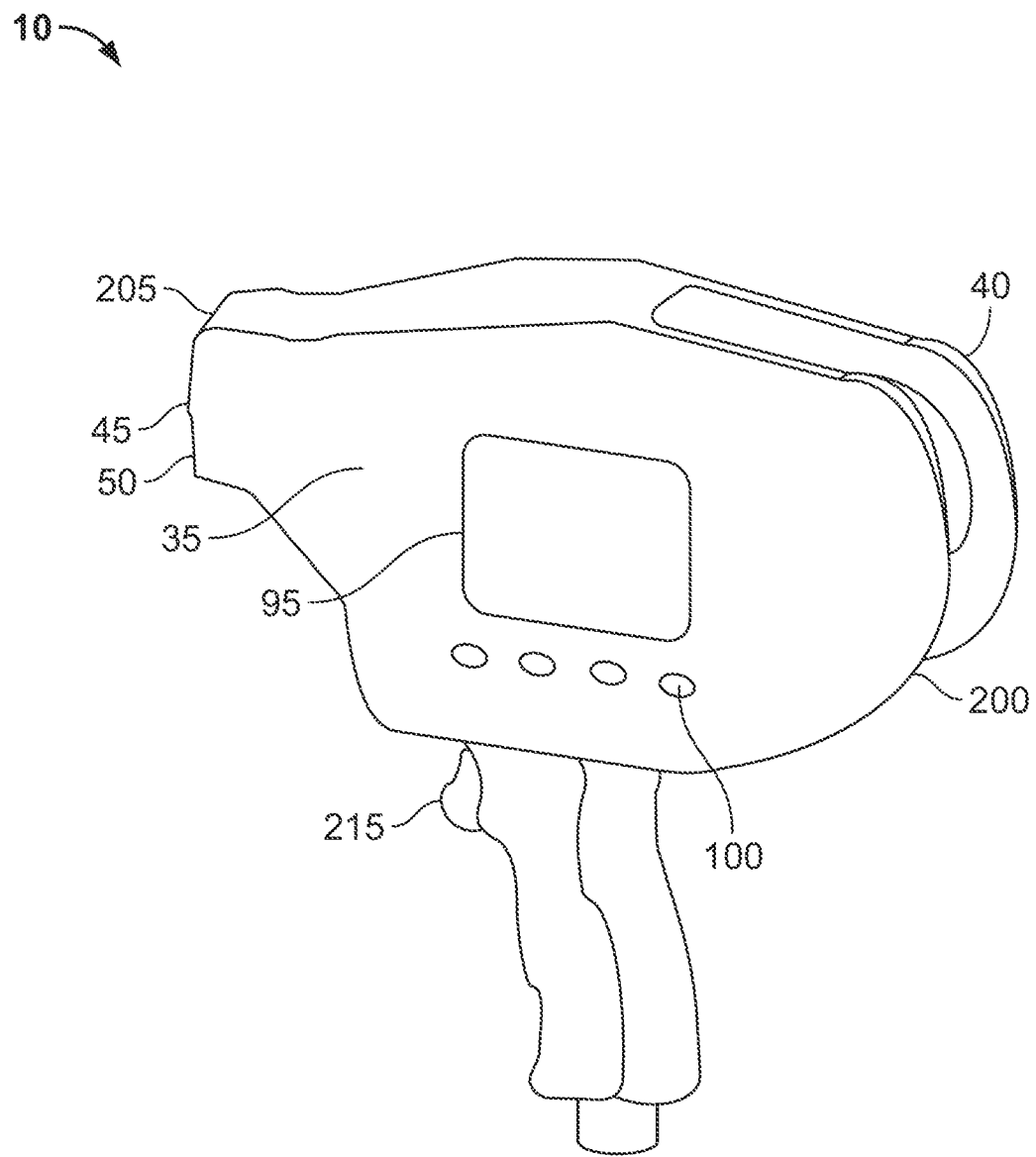
FIG. 3 is a perspective view of the cable bundling tool of FIG. 1, according to some embodiments.

FIG. 3 is a perspective view of the cable bundling tool 15 of FIG. 1, according to some embodiments. The cable bundling tool 15 includes the cartridge 20 installed in the illustrated embodiment. The cable bundling tool 15 includes the housing 35. The housing 35 includes a first end 200 and a second end 205. In some embodiments, the first end 200 can be referred to as a handle end and the second end 205 can be referred to as the tip end or workpiece end. The first receptacle 40 is disposed at the first end 200 and the second receptacle 45 and the third receptacle 50 are disposed at the second end 205. The jaw 25 and the welding horn 30 are not shown in FIG. 3. The cable bundling tool 15 includes a trigger 215 for triggering the welding of the cable material around the bundle of elongate members (e.g., wires, cables, or the like). Additional functionality of the cable bundling tool 15 has been previously described with respect to FIG. 1 and will not be repeated in additional detail for simplicity of this Specification.

Figure 4:
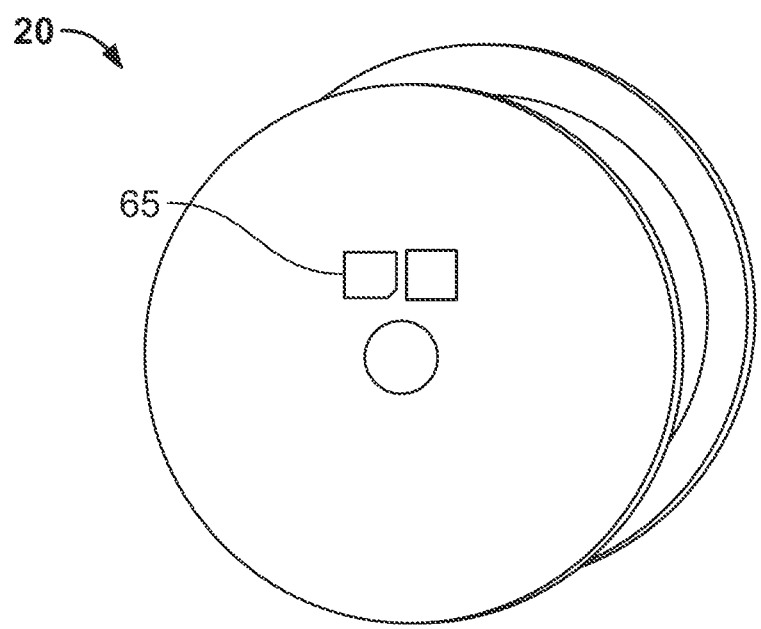
FIG. 4 is a perspective view of the cartridge of FIG. 1, according to some embodiments.

FIG. 4 is a perspective view of the cartridge 20 of FIG. 1, according to some embodiments. As shown in the illustrated embodiment, the cartridge 20 includes the programmable chip 65 secured thereto. In some embodiments, the programmable chip 65 can be disposed in a different location. For example, in some embodiments, the programmable chip 65 can be on an inner surface of the cartridge 20 or the like. It is also to be appreciated that the appearance of the programmable chip 65 is an example and is not intended to be limiting. In some embodiments, the programmable chip 65 being secured to the cartridge 20 can include embedding the programmable chip 65 into the cartridge 20 to reduce likelihood that the programmable chip 65 can be removed, replaced, or tampered with. In some embodiments, the programmable chip 65 may not be visible to a user (e.g., covered with one or more layers of material.

Figure 5:
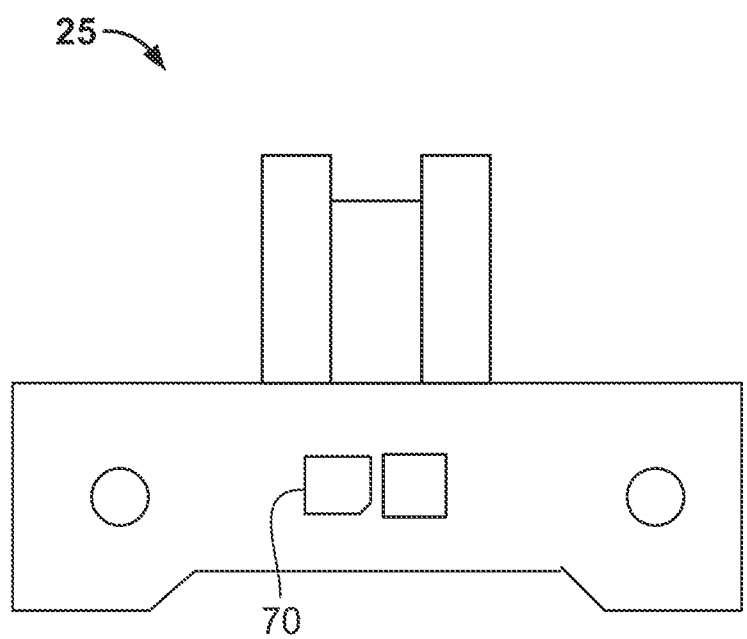
FIG. 5 is a view of the jaw of FIG. 1, according to some embodiments.

FIG. 5 is a view of the connector of the jaw 25 of FIG. 1, according to some embodiments. As shown in the illustrated embodiment, the jaw 25 includes the programmable chip 70 secured thereto. In some embodiments, the programmable chip 70 can be disposed in a different location. For example, in some embodiments, the programmable chip 70 can be on a different surface of the jaw 25 or the like. It is also to be appreciated that the appearance of the programmable chip 70 is an example and is not intended to be limiting. In some embodiments, the programmable chip 70 being secured to the jaw 25 can include embedding the programmable chip 70 into the jaw 25 to reduce likelihood that the programmable chip 70 can be removed, replaced, or tampered with. In some embodiments, the programmable chip 70 may not be visible to a user (e.g., covered with one or more layers of material.

Figure 6:
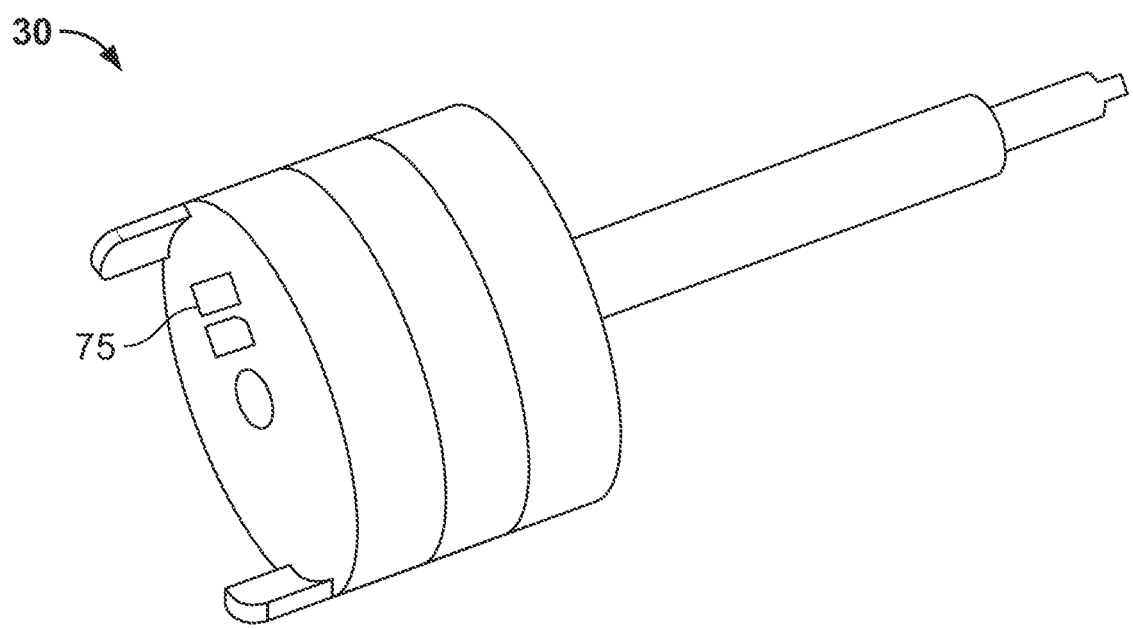
FIG. 6 is a perspective view of the welding horn of FIG. 1, according to some embodiments.

FIG. 6 is a perspective view of the welding horn 30 of FIG. 1, according to some embodiments. As shown in the illustrated embodiment, the welding horn 30 includes the programmable chip 75 secured thereto. In some embodiments, the programmable chip 75 can be disposed in a different location. For example, in some embodiments, the programmable chip 75 can be on a different surface of the 75 or the like. It is also to be appreciated that the appearance of the programmable chip 75 is an example and is not intended to be limiting. In some embodiments, the programmable chip 75 being secured to the welding horn 30 can include embedding the programmable chip 75 into the welding horn 30 to reduce likelihood that the programmable chip 75 can be removed, replaced, or tampered with. In some embodiments, the programmable chip 75 may not be visible to a user (e.g., covered with one or more layers of material.

The terminology used herein is intended to describe embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

It is to be understood that changes may be made in detail, especially to matters of the construction materials employed and the shape, size, and arrangement of parts without departing from the scope of the present disclosure. This Specification and the embodiments described are examples, with the true scope and spirit of the disclosure being indicated by the claims that follow.

What is claimed is:

1. A system, comprising:
   a tool for installing a cable material around a set of elongate members, the tool comprising:
   a housing;
   a cartridge detachably connected to the housing, the cartridge having a length of cable material;
   a jaw detachably connected to the housing,
      wherein the jaw is configured to extend around the set of elongate members to install the length of cable around the set of elongate members;
   a welding horn detachably connected to the housing; and
   at least one processor configured to read a plurality of programmable chips,
   wherein at least two of the cartridge, jaw, or welding horn include the plurality of programmable chips installed therein,
   wherein the plurality of programmable chips stores a set of parameters for a corresponding one of the cartridge, the jaw, or the welding horn.

2. The system of claim 1, wherein the plurality of programmable chips comprises:
   a first programmable chip secured to the cartridge;
   a second programmable chip secured to the jaw; and
   a third programmable chip secured to the welding horn.

3. The system of claim 2, wherein the first programmable chip stores a first set of parameters of the cartridge, the first set of parameters including at least one of a safety code, manufacturer, cable material, cable geometry, cable cross-section, cable cartridge feeding length, cable force rating, length of material remaining, optimal parameters for welding the cable, optimal jaw size, encryption, or any combinations thereof;
   wherein the second programmable chip stores a second set of parameters of the jaw, the second set of parameters including at least one of safety code, jaw type, jaw size, relative cable feeding length, manufacturer, encryption, or any combinations thereof;
   wherein the third programmable chip stores a third set of parameters of the welding horn, the third set of parameters including at least one of safety code, operable welding parameter ranges, operable tension force ranges, actual welding power, actual welding time, actual tension force, encryption, or any combinations thereof.

4. The system of claim 1, wherein the plurality of programmable chips comprises:
   a first programmable chip embedded in the cartridge;
   a second programmable chip embedded in the jaw; and
   a third programmable chip embedded in the welding horn.

5. The system of claim 1, wherein the at least one processor is further configured to program the plurality of programmable chips with updated parameters.

6. The system of claim 1, wherein the set of parameters include at least one of jaw size, safety code, cartridge manufacturer, cable material, cable geometry, bundle size, cable cartridge feeding length, tension force, welding power, welding time, or any combination thereof.

7. The system of claim 1, wherein the tool automatically adjusts one or more settings according to the set of parameters read by the at least one processor from the plurality of programmable chips.

8. The system of claim 1, wherein the plurality of programmable chips are encrypted, and the at least one processor is further configured to decrypt the plurality of programmable chips.

9. The system of claim 8, wherein by being encrypted, the plurality of programmable chips prevent a user from installing an incompatible component with the tool.

10. The system of claim 1, wherein the plurality of programmable chips is an EEPROM or RFID.

11. A method, comprising:
receiving a set of parameters from at least two components of a cable bundling tool by a processor of the cable bundling tool,
wherein the set of parameters are received in response to at least two of a cartridge, a jaw, and a welding horn being connected to a housing of the cable bundling tool,
wherein the set of parameters are received from a plurality of programmable chips secured to at least two of the cartridge, the jaw, or the welding horn; and
modifying one or more settings of the cable bundling tool based on the set of parameters.

12. The method of claim 11, further comprising storing, in a memory of the cable bundling tool, the one or more settings of the cable bundling tool as modified.

13. The method of claim 11, wherein decrypting a security key on the plurality of programmable chips with the processor through a decryption key stored in a memory of the cable bundling tool.

14. A cable bundling tool, comprising:
a housing;
a plurality of receptacles for interchangeably attaching a plurality of components; and
at least one processor for reading a plurality of programmable chips on the plurality of components;
wherein the plurality of components comprises:
a cartridge detachably connected to the housing, the cartridge having a length of cable material;
a jaw detachably connected to the housing,
wherein the jaw is configured to extend around a set of elongate members to install the length of cable around the set of elongate members; and
a welding horn detachably connected to the housing; and
wherein at least two of the cartridge, jaw, or welding horn includes the plurality of programmable chips installed therein,
wherein the plurality of programmable chips stores a set of parameters for a corresponding one of the cartridge, the jaw, or the welding horn.

15. The cable bundling tool of claim 14, wherein the plurality of receptacles further comprises:
a first receptacle configured to receive the cartridge, the cartridge having a first programmable chip secured to the cartridge;
a second receptacle configured to receive the jaw, the jaw having a second programmable chip secured to the jaw; and
a third receptacle configured to receive the welding horn, the welding horn having a third programmable chip secured to the welding horn.

16. The cable bundling tool of claim 15, wherein the at least one processor further comprises:
a first processor disposed at the first receptacle;
a second processor disposed at the second receptacle; and
a third processor disposed at the third receptacle.

17. The cable bundling tool of claim 15, wherein the plurality of programmable chips are encrypted, and the at least one processor is configured to decrypt the plurality of programmable chips to access information stored on the plurality of programmable chips.

18. The cable bundling tool of claim 15, wherein the at least one processor is configured to update information stored on the plurality of programmable chips depending on usage of the plurality of components while attached to the cable bundling tool.

19. The cable bundling tool of claim 15, further comprising an indicator light, the indicator light configured to at least one of indicate an alarm condition to a user that the cable bundling tool requires preventative maintenance, indicate an error with a connection to the plurality of components, or indicate when a consumable is depleted.

\* \* \* \* \*